US012082159B2

United States Patent
Yao et al.

(10) Patent No.: US 12,082,159 B2
(45) Date of Patent: Sep. 3, 2024

(54) EXTENDED BANDWIDTH ALLOCATION

(71) Applicant: Nokia Technologies Oy, Espoo (FI)

(72) Inventors: Chunhai Yao, Beijing (CN); Rapeepat Ratasuk, Inverness, IL (US); Muneender Chiranji, Hyderabad (IN); Nitin Mangalvedhe, Hoffman Estates, IL (US); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 306 days.

(21) Appl. No.: 17/764,249

(22) PCT Filed: Sep. 29, 2019

(86) PCT No.: PCT/CN2019/108988
§ 371 (c)(1),
(2) Date: Mar. 28, 2022

(87) PCT Pub. No.: WO2021/056525
PCT Pub. Date: Apr. 1, 2021

(65) Prior Publication Data
US 2023/0025011 A1    Jan. 26, 2023

(51) Int. Cl.
*H04W 72/02* (2009.01)
*H04L 5/00* (2006.01)
*H04W 72/0453* (2023.01)

(52) U.S. Cl.
CPC .......... *H04W 72/02* (2013.01); *H04L 5/0012* (2013.01); *H04W 72/0453* (2013.01)

(58) Field of Classification Search
CPC .. H04W 72/0453; H04W 72/02; H04L 5/0012
(Continued)

(56) References Cited

U.S. PATENT DOCUMENTS

| 2011/0125491 A1* | 5/2011 | Alves | G10L 21/0364 |
| | | | 704/226 |
| 2011/0125492 A1* | 5/2011 | Alves | G10L 21/0272 |
| | | | 704/226 |

(Continued)

FOREIGN PATENT DOCUMENTS

| CN | 107733622 A | 2/2018 |
| CN | 109155719 A | 1/2019 |

(Continued)

OTHER PUBLICATIONS

3GPP TSG RAN WG1 Meeting #88, Athens, Greece Feb. 13-18, 2017, R1-1702660, "Resource Allocation and DCI design for FeMTC", Lenovo, Motorola Mobility, 5 pgs.

(Continued)

*Primary Examiner* — Peter G Solinsky
(74) *Attorney, Agent, or Firm* — Robert P. Michal, Esq.; Carter, DeLuca & Farrell LLP

(57) ABSTRACT

Example embodiments of the present disclosure relate to devices, methods, apparatuses and computer readable storage media of extended bandwidth allocation. In example embodiments, a first device receives, from a second device, an indication of a reference bandwidth. The first device receives, from the second device, an indication of a bandwidth extended from the reference bandwidth and receives, from the second device, an indication of at least one frequency offset of a first set of narrowbands with respect to a second set of narrowbands associated with the reference bandwidth. Then, the first device determines, based on the reference bandwidth, the extended bandwidth and the at least one frequency offset, the first set of narrowbands for communication with the second device.

54 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0238292 A1 | 8/2017 | Rico Alvarino et al. | ......... 72/44 |
| 2018/0077689 A1 | 3/2018 | Rico Alvarino et al. | |
| 2018/0332505 A1 | 11/2018 | Kim et al. | ......... 28/20 |
| 2020/0075038 A1* | 3/2020 | Sung | ......... H04M 3/2236 |

FOREIGN PATENT DOCUMENTS

| | | |
|---|---|---|
| CN | 109479280 A | 3/2019 |
| EP | 3535917 A1 | 9/2019 |
| WO | WO 2017/139540 A1 | 8/2017 |
| WO | WO-2018/031927 A1 | 2/2018 |
| WO | WO-2018/085145 A1 | 5/2018 |
| WO | WO 2018/190620 A1 | 10/2018 |

OTHER PUBLICATIONS

3GPP TSG RAN WG1 Meeting #96bis, Xi'an, China, Apr. 8-12, 2019, R1-1904170, "Coexistence of eMTC with NR", Nokia, Nokia Shanghai Bell, 6 pgs.

3GPP TSG-RAN WG1 #96bis, Apr. 8-12, 2019, Xi'an, China, R1-1904520, "Coexistence of LTE-MTC with NR", Qualcomm Incorporated, 7 pgs.

3GPP TSG RAN WG1 Meeting #96bis, Xi'an, China, Apr. 8-12, 2019, R1-1905535, "Feature lead summary for Coexistence of LTE-MTC with NR", Ericsson, 11 pgs.

3GPP TSG RAN WG1 Meeting #97, Reno, USA, May 13-17, 2019, R1-196508, "Coexistence of NB-IoT with NR", ZTE, 4 pgs.

"Coexistence of eMTC with NR", 3GPP TSG RAN WG1 Meeting #96, R1-1901956, Agenda item: 6.2.1.4, Nokia, Feb. 25-Mar. 1, 2019, 5 pages.

"Coexistence of LTE-MTC with NR", 3GPP TSG-RAN WG1 Meeting #96, R1-1901740, Agenda Item: 6.2.1.4, Ericsson, Feb. 25-Mar. 1, 2019, pp. 1-12.

"3rd Generation Partnership Project; Technical Specification Group Radio Access Network; Evolved Universal Terrestrial Radio Access (E-UTRA); Multiplexing and channel coding (Release 15)", 3GPP TS 36.212, V15.5.0, Mar. 2019, pp. 1-246.

"New WID on Rel-16 MTC enhancements for LTE", 3GPP TSG RAN Meeting #80, RP-181450, Agenda Item: 10.1.3, Ericsson, Jun. 11-14, 2018, 4 pages.

"Coexistence of eMTC with NR", 3GPP TSG RAN WG1 Meeting #95, R1-1812906, Agenda item : 6.2.1.4, Nokia, Nov. 12-16, 2018, 4 pages.

"Coexistence of LTE-MTC with NR", 3GPP TSG RAN WG1 Meeting #95, R1-1812122, Agenda Item: 6.2.1.4, Ericsson, Nov. 12-17, 2018, pp. 1-16.

"Coexistence of LTE-MTC with NR", 3GPP TSG-RAN WG1 #95, R1-1813041, Agenda Item: 6.2.1.4, Qualcomm Incorporated, Nov. 12-16, 2018, pp. 1-6.

"Coexistence of LTE-MTC with NR", 3GPP TSG RAN WG1 Meeting #95, R1-1812767, Agenda item: 6.2.1.4, ZTE, Nov. 12-16, 2018, 4 pages.

"Revised WID: Additional MTC enhancements for LTE", 3GPP TSG RAN meeting #82, RP-182891, Agenda Item: 10.4.1, Qualcomm Incorporated, Dec. 10-13, 2018, 4 pages.

"3rd Generation Partnership Project; Technical Specification Group Radio Access Network; NR; Base Station (BS) radio transmission and reception (Release 15)", 3GPP TS 38.104, V15.4.0, Dec. 2018, pp. 1-208.

"3rd Generation Partnership Project; Technical Specification Group Radio Access Network; NR; User Equipment (UE) radio transmission and reception; Part 1: Range 1 Standalone (Release 15)", 3GPP TS 38.101-1, V15.4.0, Dec. 2018, pp. 1-230.

"3rd Generation Partnership Project; Technical Specification Group Radio Access Network; Evolved Universal Terrestrial Radio Access (E-UTRA); User Equipment (UE) radio transmission and reception (Release 16)", 3GPP TS 36.101, V16.0.0, Dec. 2018, 1820 pages.

"3rd Generation Partnership Project; Technical Specification Group Radio Access Network; NR; Physical layer procedures for data (Release 15)", 3GPP TS 38.214, V15.5.0, Mar. 2019, pp. 1-103.

"Use of LTE control channel region for DL transmission in LTE-MTC", 3GPP TSG-RAN WG1 Meeting #96, R1-1901744, Agenda Item: 6.2.1.8, Ericsson, Feb. 25-Mar. 1, 2019, pp. 1-6.

* cited by examiner

EXTENDED BANDWIDTH ALLOCATION

CROSS REFERENCE TO RELATED APPLICATION

This patent application is a U.S. National Stage application of International Patent Application Number PCT/CN2019/108988 filed Sep. 29, 2019 which is hereby incorporated by reference in its entirety.

FIELD

Example embodiments of the present disclosure generally relate to the field of communications, and in particular, to devices, methods, apparatuses and computer readable storage media of extended bandwidth allocation.

BACKGROUND

In enhanced Machine Type Communication (eMTC) of Long Term Evolution (LTE), an eMTC device can operate in different LTE system bandwidths. In order to enable co-existence of eMTC in LTE with New Radio (NR), when the eMTC device operates in a LTE carrier that is deployed within a NR system bandwidth, the minimum system bandwidth for eMTC would be 1.4 MHz for backward compatibility with a legacy eMTC device. The system bandwidth could be also 3 MHz or 5 MHz. If the system bandwidth is larger, such as 20 MHz, more physical resources can be used for eMTC, and more eMTC devices can be supported with a larger channel capacity.

However, if a larger channel bandwidth is allocated for eMTC, more resources will be reserved for eMTC in the NR system. Accordingly, flexibility of scheduling, such as the coreset resource allocation, would be reduced, and NR performance may also be reduced.

SUMMARY

In general, example embodiments of the present disclosure provide devices, methods, apparatuses and computer readable storage media of extended bandwidth allocation.

In a first aspect, a first device is provided which comprises at least one processor and at least one memory including computer program code. The at least one memory and the computer program code are configured to, with the at least one processor, cause the first device to receive, from a second device, an indication of a reference bandwidth. The first device is further caused to receive, from the second device, an indication of a bandwidth extended from the reference bandwidth and receive, from the second device, an indication of at least one frequency offset of a first set of narrowbands with respect to a second set of narrowbands associated with the reference bandwidth. The first device is caused to determine, based on the reference bandwidth, the extended bandwidth and the at least one frequency offset, the first set of narrowbands for communication with the second device.

In a second aspect, a second device is provided which comprises at least one processor and at least one memory including computer program code. The at least one memory and the computer program code are configured to, with the at least one processor, cause the second device to send, to a first device, an indication of a reference bandwidth. The second device is caused to determine a bandwidth extended from the reference bandwidth and at least one frequency offset of a first set of narrowbands with respect to a second set of narrowbands associated with the reference bandwidth. The second device is further caused to send, to the first device, an indication of the extended bandwidth and an indication of the at least one frequency offset to allow communication with the first device in the first set of narrowbands.

In a third aspect, a method is provided. In the method, a first device receives, from a second device, an indication of a reference bandwidth. The first device receives, from the second device, an indication of a bandwidth extended from the reference bandwidth and receives an indication of at least one frequency offset of a first set of narrowbands with respect to a second set of narrowbands associated with the reference bandwidth. Then, the first device determines, based on the reference bandwidth, the extended bandwidth and the at least one frequency offset, the first set of narrowbands for communication with the second device.

In a fourth aspect, a method is provided. In the method, a second device sends, to a first device, an indication of a reference bandwidth. Further, the second device determines a bandwidth extended from the reference bandwidth and at least one frequency offset of a first set of narrowbands with respect to a second set of narrowbands associated with the reference bandwidth. Then, the second device sends, to the first device, an indication of the extended bandwidth and an indication of the at least one frequency offset to allow communication with the first device in the first set of narrowbands.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
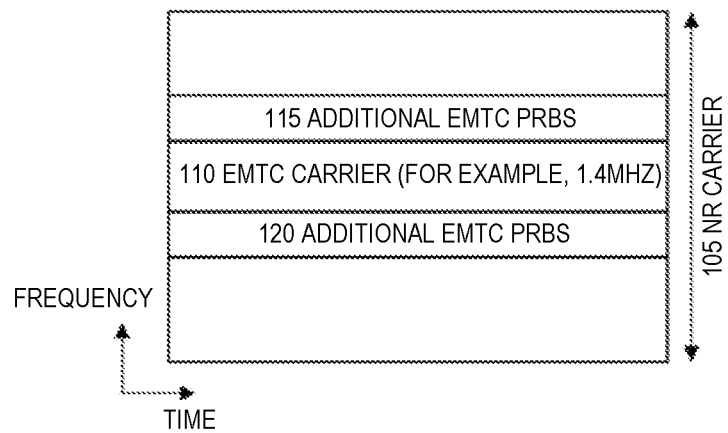
FIGS. 1(a) and 1(b) illustrate example resource allocation for the co-existence of LTE eMTC with NR.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure. The UE may also correspond to Mobile Termination (MT) part of the integrated access and backhaul (IAB) node (a.k.a. a relay node).

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like. A relay node may correspond to Distributed Unit (DU) part of the IAB node.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

It is being studied to potentially support MTC transmission outside a legacy LTE system bandwidth while supporting legacy LTE-MTC transmission for a legacy LTE-MTC user equipment (UE) within the legacy LTE system bandwidth. In this way, the cost of reserving resources in NR for a Cell-specific Reference Signal (CRS), System Information Block 1 (SIB1) Bandwidth Reduced (SIB1-BR), paging and the like may be reduced. The objective of this study is to reduce the number of reserved Physical Resource Blocks (PRBs) in NR, and meanwhile some flexibility is still available to improve the eMTC performance with the additional PRB allocations.

Figure 1B:
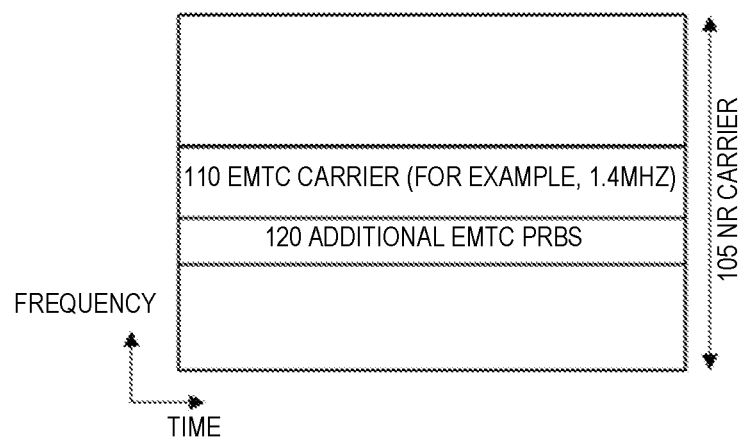

FIGS. 1(a) and 1(b) show example resource allocation for the co-existence of LTE eMTC with NR. As shown in FIG. 1(a), in a NR carrier 105, outside an eMTC carrier 110 of 1.4 MHZ, for example, two sets 115 and 120 of additional eMTC PRBs are allocated to eMTC. In FIG. 1(b), in the NR carrier 105, the set 120 of additional eMTC PRBs is allocated outside the eMTC carrier 110. As shown, the additional PRBs may be allocated on either side or both sides of the eMTC carrier 110. The number of PRBs allocated may be indicated to a UE.

In order to support the usage of PRBs outside the legacy LTE bandwidth, the following issues need to be solved:

How is the additional PRBs allocated for a new UE (or a NR UE)?

How to avoid resource collision between legacy UEs and new UEs, especially in the case that frequency hopping is enabled?

How to indicate a frequency-domain location of additional PRBs for a new UE?

How to avoid impact to a legacy UE?

In the transmission outside the eMTC bandwidth, the additional PRBs can be a part of a newly defined narrowband (NB) or may be seen as a part of a virtual carrier (for example, a virtual 3 MHz eMTC carrier), which can be dynamically assigned. These PRBs may not carry a CRS. The CRS can be transmitted on demand, or DMRS-based transmission mode can be used.

Example embodiments of the present disclosure provide a resource allocation scheme where an extended frequency band (for example, including PRBs) is allocated to a device for communication. With this scheme, in addition to a reference bandwidth with a set of narrowbands (for example, legacy NBs), the device is indicated with a bandwidth extended from the reference bandwidth and a frequency offset of a further set of NB s (for example, extended NBs or E-NBs) with respect to the set of NBs associated with the reference bandwidth. Based on the frequency offset, the reference bandwidth and the extended bandwidth, the device determines the set of extended bandwidth for communication.

In some example embodiments, the communication comprises an eMTC carrier deployed within a NR carrier. In these example embodiments, a legacy LTE system bandwidth (for example, 1.4 MHz) may be broadcasted by a network device such as an eNB, to provide the basic NBs for eMTC usage. A frequency offset may be indicated to a terminal device such as UE in a master information block (MIB), system information block (SIB) or Radio Resource Control (RRC) signaling. The frequency offset may represent an offset of the lowest E-NB to the lowest basic NB in a frequency domain, where the lowest basic NB is the lowest narrowband in the frequency domain in the legacy LTE system bandwidth. The value of the frequency offset may be negative or positive, which depends on the specific E-NB allocation in the frequency domain relative to the lowest basic NB. An extended bandwidth for the E-NBs is also indicated to the terminal device, for example, in the SIB or RRC signaling. The terminal device uses three parameters, including the frequency offset, the broadcast legacy LTE bandwidth, the extended bandwidth, to determine a frequency-domain location (for example, the exact PRB locations) where the E-NBs are placed.

In some example embodiments, the terminal device may report the capability of supporting the additional PRBs usage. Moreover, RRC or other higher-layer signaling informs the terminal device whether the feature of the additional PRBs usage is enabled or disabled. The E-NB may be adjacent to the legacy or basic NB and comprise the same number of PRBs (for example, 6 PRBs) as the basic NB. Accordingly, the new additional PRB resource with the unit of 6 PRBs could be freely allocated to be adjacent to the eMTC narrow band. In some example embodiments, the E-NBs and the basic NBs may be re-indexed within the extended bandwidth. With the proposed scheme, the frequency-domain resources may be used more effectively and efficiently, while legacy UE behavior will not be impacted.

Figure 2:
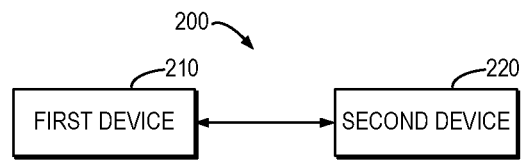
FIG. 2 illustrates an example environment in which example embodiments of the present disclosure can be implemented.

FIG. 2 shows an example environment 200 in which example embodiments of the present disclosure can be implemented.

The environment 200, which may be a part of a communication network, comprises devices 210 and 220 communicating with each other, which are referred to as a first device 210 and a second device 220, respectively. The first and second devices 210 and 220 may be implemented by any suitable devices in the communication network. For example, the first device 210 may be implemented by a terminal device such as a UE, and the second device 220 may be implemented by a network device such as a base station. As another example, the first and second devices 210 and 220 may be both implemented by terminal devices. Only for the purpose of discussion, in some example embodiments, the terminal device will be taken as an example of the first device 210, and the network device will be taken as an example of the second device 220.

Two devices are shown in the environment 200 only for illustration without suggesting any limitation. The environment 200 may comprise any suitable number of devices. For example, in the example embodiments, the first device 210 is implemented by a terminal device and the second device 220 is implemented by a network device, the environment 200 may comprise another terminal device to communicate with the second device 220.

The communication in the environment 200 may follow any suitable communication standards or protocols, which are already in existence or to be developed in the future, such as Universal Mobile Telecommunications System (UMTS), Long Term Evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, machine type communication (MTC), enhanced Machine Type Communication (eMTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

Figures 3A, 3B, 3C:
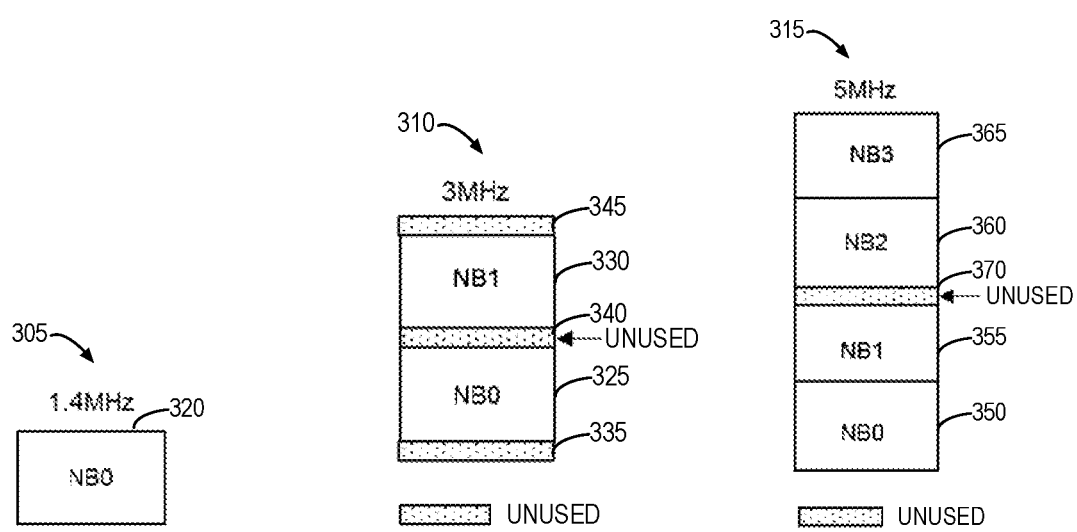
FIGS. 3(a), 3(b) and 3(c) illustrate example NB deployment in different bandwidths.

The first device 210 can use one or more NBs for communication such as eMTC with the second device 220. FIGS. 3(a), 3(b) and 3(c) show NB definitions in different example bandwidths 305, 310 and 315 for legacy deployments. The 1.4 MHz bandwidth 305 as shown in FIG. 3(a) is provided with a NB 320, labeled as NB0. The 3 MHz bandwidth 310 as shown in FIG. 3(b) is provided with two NBs 325 and 330, labeled as NB0 and NB1.

A narrowband may comprise 6 PRBs. If the number of PRBs in the bandwidth is not equal to an integer multiple of 6 (the number of PRBs in a narrowband), the leftover PRBs outside of the narrowband(s) in the bandwidth are unallocated for eMTC. The locations of all the NBs and hence the locations of the unallocated PRBs may be defined in the eMTC specification for all supported LTE system bandwidths. If the system bandwidth comprises an odd number of PRBs, there may be always one unallocated PRB in the middle of the bandwidth, which appears as a frequency gap between contiguous narrowbands. For all system bandwidths larger than 1.4 MHz, there may be an allocated band at either edge of the bandwidth comprising at least one PRB.

Thus, in the 3 MHz bandwidth 310, there are three unallocated bands 335, 340 and 345 which are unused for the communication. Each of the unallocated bands 335, 340 and 345 may comprise one PRB. The unallocated band may also comprise any other integral number of PRBs. As shown in FIG. 3(c), the 5 MHz bandwidth 345 is provided with four NBs 350, 355, 360 and 365 (labeled as NB0, NB1, NB2 and NB3) and one unallocated band 370 (for example, one PRB).

Table 1 shows the numbers of NBs in six bandwidths for use in eMTC in LTE, for example.

| | Channel Bandwidth (MHz) | | | | | |
|---|---|---|---|---|---|---|
| | 1.4 | 3 | 5 | 10 | 15 | 20 |
| Number of PRBs | 6 | 15 | 25 | 50 | 75 | 100 |
| Number of NBs | 1 | 2 | 4 | 8 | 12 | 16 |

In various example embodiments, when allocating resources to the first device 210, in addition to, or instead of, the NBs in the bandwidth as shown in FIGS. 3(a)-3(c), one or more extended NBs (E-NBs) are allocated to the first device 210. The first device 210 receives three parameters from the second device 220, including a reference bandwidth, an extended bandwidth and a frequency offset of a set of E-NBs with respect to a set of basic NBs associated with the reference bandwidth. Accordingly, the first device 210 determines determine a frequency-domain location of the E-NBs, for example, the exact PRB locations.

Figure 4:
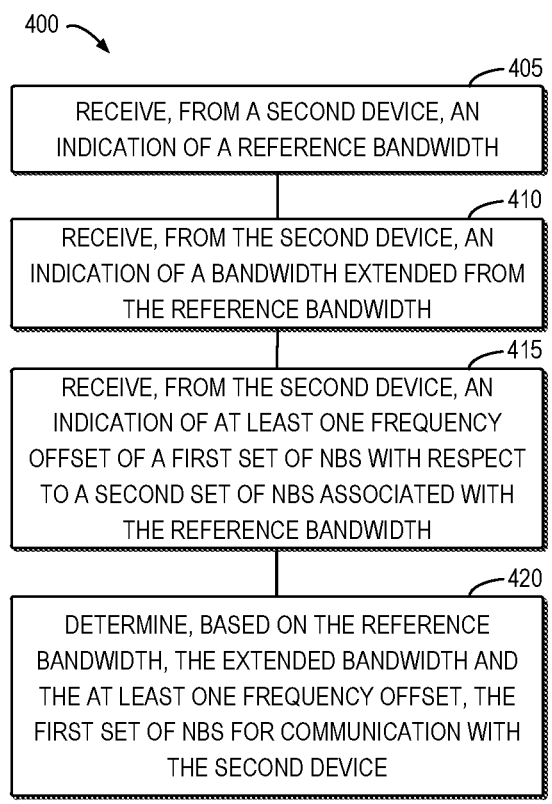
FIG. 4 illustrates a flowchart of an example method according to some example embodiments of the present disclosure.

FIG. 4 shows a flowchart of an example method 400 of bandwidth extending according to some example embodiments of the present disclosure. The method 400 can be implemented by the first device 210 as shown in FIG. 2. For the purpose of discussion, the method 400 will be described with reference to FIG. 2.

At block 405, the first device 210 receives an indication of a reference bandwidth from the second device 220. The reference bandwidth may be a legacy LTE system bandwidth such as 1.4 MHz, 3 MHz, 5 MHz, 10 MHz, 15 MHz and 20 MHz as shown in Table 1. The indication may be broadcast by the second device 220 for example in a physical Broadcast Channel (PBCH). The indication may also be sent by UE specific signaling.

At block 410, the first device 210 receives an indication of a bandwidth extended from the reference bandwidth from the second device 220. The indication may be carried in SIB or RRC signaling. Other broadcast or dedicated signaling or messages may be used for transmitting the indication. The extended bandwidth may be any suitable bandwidth extended from the reference bandwidth, such as 3 MHz, 5 MHz, 10 MHz, 15 MHz and 20 MHz.

In some example embodiments, if the first device 210 has the capability to support a larger bandwidth than 20 MHz, more resources may be available to the first device 210. For example, the second device 220 may broadcast another bandwidth parameter, which could be a cell bandwidth of NR (for example, 100 MHz). In this case, the first device 210 may indicate its capability of using a larger system bandwidth to the second device 220. Accordingly, the extended bandwidth allocated by the second device 220 may be a cell bandwidth of NR such as 100 MHz.

At block 415, the first device 210 receives an indication of at least one frequency offset of a set (referred to as a first set) of NBs (for example, E-NBs) with respect to a further set (referred to as a second set) of NBs (for example, legacy NBs) associated with the reference bandwidth. The indication may also be sent using SIB or RRC signaling or any other suitable signaling or messages. The second set of NBs may comprise the NBs within any one of different reference bandwidths as shown in FIG. 2. The number of NBs in the second set may be the same as the number for the corresponding bandwidth as shown in Table 1.

The first set of NBs may comprise any suitable number of NBs depending on the network implementations. The number of NBs in the first set may be different for DL and UL communication. In some example embodiments, the at least one frequency offset may comprise a frequency offset of a reference NB (referred to as a first reference NB) in the first set of NBs to a reference NB (referred to as a second reference NB) in the second set of NBs. The frequency offset may be indicated by the number of PRBs. Accordingly, the indication of the frequency offset may be implemented by the number of PRBs.

The first reference NB may be the lowest NB in the first set of NBs in the frequency domain. The second reference NB may be the lowest NB in the second set of NBs in the frequency domain. The value of the frequency offset can be negative or positive, which may depend on the allocation of the first reference NB relative to the second reference NB in the frequency domain.

The first set of NBs may comprise contiguous NBs. Accordingly, only one frequency offset may be sufficient to indicate a location of the first set of NBs relative to the second set of NBs. Alternatively or in addition, the first set of NBs may comprise contiguous NBs. In this case, more than one frequency offsets may be indicated to the first device 210 to specify the locations of the contiguous NBs relative to the second set of NBs.

The NB in the first set may occupy any suitable size of resources. For example, the NB in the first set may occupy a predefined or dynamically configured number of PRBs. In some example embodiments, the number of PRBs may be the same as that in a legacy NB in LTE, such as 6 PRBs. The additional PRBs of the first set of NBs are outside of the reference bandwidth. The unit of additional PRBs is a single PRB.

In some example embodiments, the first set of NBs may be adjacent to the legacy NBs. That is, no unallocated band (or PRB) is inserted between the second set of NBs and the first set of NBs. As such, there is no need to indicate the unallocated band, and therefore the system overhead may be further reduced. The first set of NBs may be on either side or both sides of the second NBs. No matter which side the first set of NBs is, there may be no unallocated band or PRB between the first and second sets of NBs.

In some example embodiments, for DL communication, only a part of time duration (for example, some subframes) for a NB in the first set carries a cell-specific reference signal (CRS). Other subframes may contain a CRS only when there is transmission in a Physical Downlink Shared Channel (PDSCH)/MTC Physical Downlink Control Channel (MPDCCH) to further reduce the reserved resources to improve the resource efficiency.

In some example embodiments, the reference bandwidth may be extended in the case that the first device 210 supports the extending. In these embodiments, the first device 210 may send an indication of a capability of using the extended bandwidth to the second device 220. Then, the second device 220 will know that the first device 210 supports the bandwidth extending and will allocate the extended bandwidth to the first device 210. In some example embodiments, the second device 220 may send an indication of enabling the extended bandwidth. In response to this indication, the first device 210 will know that the extended bandwidth is available. The second device 220 may also send an indication of disabling the extended bandwidth to the first device 210 when no extended bandwidth is allocated to the first device 210.

At block 420, based on the reference bandwidth, the extended bandwidth and the at least one frequency offset, the first device 210 determines the first set of NBs for communication with the second device 220. Further, the first device 210 may receive from the second device 220 an indication of a frequency resource allocated from the first set of NBs. The frequency resource may be allocated by the second device 220 or other suitable devices or entities. The first device 210 may use the allocated frequency resource to communicate with the second device 220.

For a legacy device (for example, a legacy UE), the second set of NBs (for example, the legacy NBs) may be used for communication. As such, the legacy UEs is not required to know the extended narrowbands and can operate normally, thereby achieving backward compatibility.

In some example embodiments, the first device 210 may re-index the first set of NBs and the second set of NBs within the extended bandwidth. The re-indexing may be in an order of increasing PRB number.

Figure 5:
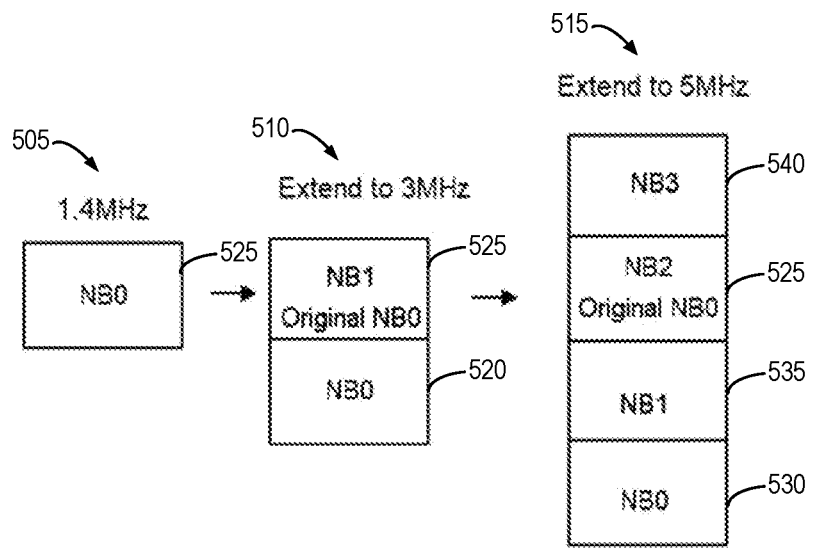
FIG. 5 illustrates example bandwidth extending according to some example embodiments of the present disclosure.

FIG. 5 shows example bandwidth extending according to some example embodiments of the present disclosure.

In this example, a 1.4 MHz reference bandwidth 505 is extended to a 3 MHz extended bandwidth 510 and a 5 MHz extended bandwidth 515. For example, in the example embodiments where the first device 210 is implemented by a UE and the second device 220 is implemented by a base station, the PBCH may be used by the second device 220 to indicate to the first device 210 that an original system bandwidth is 1.4 MHz. The first device 210 may be indicated by SIB or RRC signaling that the bandwidth is to be extended to a 3 or 5 MHz channel bandwidth. The first set of NBs comprises E-NBs, and the second set of NBs comprises legacy NBs.

For a 1.4 MHz system bandwidth (including 6 PRBs), 1.08 MHz can be used for data transmission, other frequency resources are unallocated. In this example as shown in FIG. 5, the unallocated band is not needed for resource extension. There is also no need to include a frequency gap in the case of the legacy narrowbands for a 3 MHz system bandwidth. In this case, a new narrowband is just adjacent to the original narrowband.

In the case that the 1.4 MHz reference bandwidth 505 is extended to the 3 MHz extended bandwidth 510, the indicated frequency offset is −1. This means that the lowest E-NB 520 is lower than the lowest legacy NB 525 (labeled as NB0 in the reference bandwidth 505) by one NB. As shown, in the extended bandwidth 510, the two NBs 520 and 525 are re-indexed. The E-NB 520 is the starting NB, labeled as NB0, and the legacy NB 525 is labeled as NB1. After the extended bandwidth 510 is indicated to the first device 210, the first device 210 can determine that there are two NBs, including NB0 and NB1, for resource allocation.

In the case that the 1.4 MHz reference bandwidth 505 is extended to the 5 MHz extended bandwidth 515, the indicated frequency offset is −2. This means that the lowest E-NB 530 is lower than the lowest NB 525 (original NB0 in the reference bandwidth 505) by two NBs. After the 5 MHz extended bandwidth 515 is indicated to the first device 210, the first device 210 knows that there are three E-NBs 530, 535 and 540 for resource allocation. The NBs within the 5 MHz extended bandwidth 515 are re-indexed where the lowest E-NB 530 is labeled as NB0, other two E-NBs 535 and 540 are labeled as NB1 and NB3, and the legacy NB 525 is labeled as NB2.

As described above, in the 3 MHz and 5 MHz extended bandwidths 510 and 515, the index NB0 in the 1.4 MHz bandwidth 505 is re-indexed as NB1 and NB2, respectively. The re-indexing is based on frequency-domain locations of the E-NBs (for example, the additional PRBs) relative to the legacy NBs of the 1.4 MHz bandwidth 505. The re-indexing is needed if a new NB (or an E-NB) is "below" the original NB0 (that is, a negative offset to legacy NB0) in the frequency domain. If a new NB is "above", no re-indexing is needed. The "below"/"above" location corresponds to a negative/positive offset.

Figure 6:
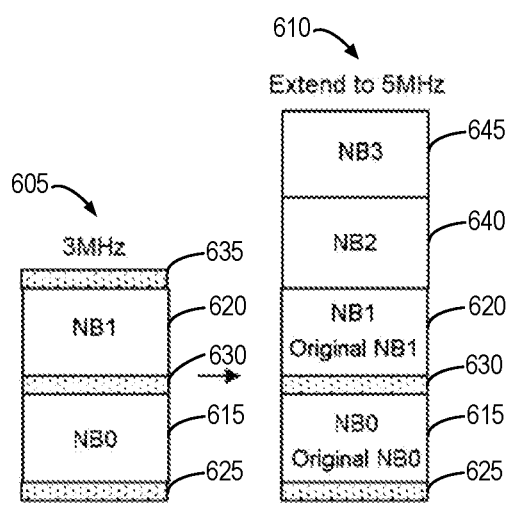
FIG. 6 illustrates example bandwidth extending according to some other example embodiments of the present disclosure.

FIG. 6 shows example bandwidth extending according to some other example embodiments of the present disclosure.

In this example, similar to that as shown in FIG. 5, the first set of NBs comprises E-NBs, and the second set of NBs comprises legacy NBs. A 3 MHz reference bandwidth 605 is extended to a 5 MHz extended bandwidth 610. According to Table 1, the 3 MHz reference bandwidth 605 may comprise 15 PRBs, and the 5 MHz extended bandwidth 610 may comprise 25 PRBs. The reference bandwidth 605 comprises two NBs 615 and 620 (labeled as NB0 and NB1) and three unused bands 625, 630 and 635. The offset is "+2", and therefore two upper E-NBs 640 and 645 are added, labeled as NB2 and NB3. Since the offset is positive, no re-indexing is needed.

The E-NBs 640 and 645 are adjacent to the legacy NBs 615 and 620. Accordingly, the upper edge unallocated band 635 (for example, a PRB) is used by the new NB 640 and is not reserved any more. The unallocated bands 625 and 630 are remaining as shown, which are still not used but counted in the new bandwidth 610.

In the example embodiments where the legacy NB or E-NB comprises PRBs, the first device 210 may first identify the allocated narrowband, which may be the legacy NB or the E-NB. Then, the first device 210 may identify the PRB(s) in the NB or E-NB. The guard PRB (not belonging to a NB) in the reference bandwidth may be kept, if no E-NB is adjacent to that PRB. The unallocated PRB (not belonging to a NB) in the reference bandwidth is removed, if the E-NB is adjacent to that PRB. That is, this PRB is mapping to the E-NB.

In some example embodiments, the specific E-NB to be used by the first device 210 depends on network scheduling. The total number of available E-NBs is equal to or smaller than the total number of NBs in the extended bandwidth minus the number of legacy NBs in the reference bandwidth.

In the example embodiments where the reference bandwidth is a legacy LTE system bandwidth, for the DL or UL resource allocation, the number of bits for the resource block assignment field is ceil(log$_2$(floor($N_{RB}^{UL}$/6)))+5 for Physical Uplink Shared Channel (PUSCH) scheduling in Control Element (CE) Mode A where the parameter $N_{RB}^{UL}$ represents a LTE system bandwidth in terms of a number of uplink PRBs. In order to schedule the additional PRBs outside the reference bandwidth, the parameter $N_{RB}^{UL}$ may represent the extended bandwidth instead.

In some example embodiments, the first device 210 may only use the E-NBs for communication. The legacy NBs are used by a legacy terminal device to keep the backward compatibility for legacy devices. For example, in the extended bandwidth 610 as shown in FIG. 6, the legacy NBs 615 and 620 (labeled as NB0 and NB1) can be used by a legacy UE which do not know the E-NBs 640 and 645 (labeled as NB2 and NB3). For example, a legacy UE transmits on PRBs in NB0 and then in NB1. The first device 210 may use the E-NBs 640 and 645 for communication. In some other example embodiments, the first device 210 may use all the four NBs 615, 620, 640 and 645 for communication.

In some example embodiments, the first device 210 may use frequency hopping in the communication. The hopping pattern may be predefined or configured dynamically. For example, in the example embodiments where only the first set of NBs are allocated, the first device 210 may use only the first set of NBs to hop for UE specific MPDCCH search space and PDSCH/Physical Uplink Shared Channel (PUSCH). In the example embodiments where all the NBs (including the first and second set of NBs) within the extended bandwidth are available, the first device 210 can hop in all the NBs. The first device 210 may also hop only in the second set of NBs. For a certain terminal device (for example, a legacy UE), the frequency hopping may be occur in the second set of NBs (for example, the legacy NBs).

In order to further improve the flexibility of resource allocation, in some example embodiments, a part of time duration for a NB in the first set (for example, an E-NB) may be used by a legacy device. For example, some symbols in an E-NB may be used by a legacy UE. In some cases, the E-NB may comprise PRBs of higher subcarrier spacing (SCS). Accordingly, only a portion of a subframe may be used by NR scheduling, and the remaining portion can be used for LTE-M. In some example embodiments, a few additional bits in DCI may indicate the OFDM symbols applicable for the first device 210 within the E-NB. Other implementations for indicating the available symbols are possible.

Figure 7:
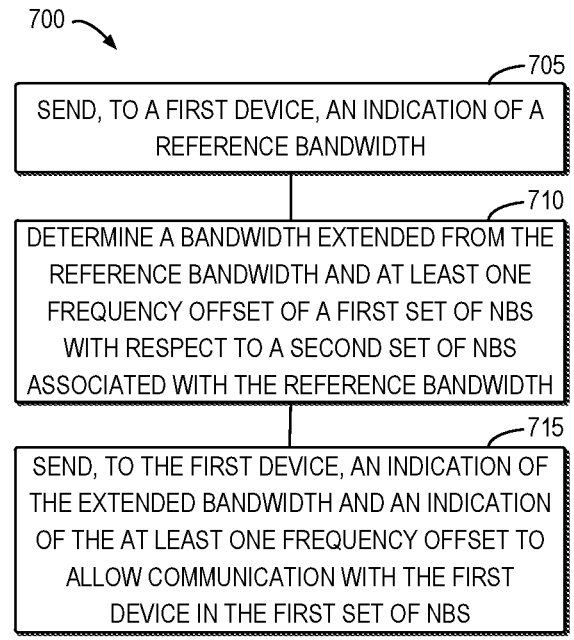
FIG. 7 illustrates a flowchart of an example method according to some other example embodiments of the present disclosure.

FIG. 7 shows a flowchart of an example method 700 of bandwidth extending according to some other example embodiments of the present disclosure. The method 700 can be implemented by the second device 220 as shown in FIG. 2. For the purpose of discussion, the method 700 will be described with reference to FIG. 2.

At block 705, the second device 220 sends an indication of a reference bandwidth, to the first device 210. The indication of the reference bandwidth may be broadcast by the second device 220.

At block 710, the second device 220 determines a bandwidth extended from the reference bandwidth and at least one frequency offset of the first set of NBs with respect to the second set of NBs associated with the reference bandwidth. The extended bandwidth may comprise a cell bandwidth.

The first set of NBs may be adjacent to the second set of NBs. The first set of NBs may be on either side or both sides of the second set of NBs. In some example embodiments, the at least one frequency offset may comprise a frequency offset of the first reference NB in the first set of NBs with respect to the second reference NB in the second set of NBs. In some example embodiments, the indication of the frequency offset of the first reference narrowband with respect to the second reference narrowband may comprise the number of PRBs.

At block 715, the second device 220 sends, to the first device 210, an indication of the extended bandwidth and an indication of the at least one frequency offset to allow communication with the first device 210 in the first set of narrowbands. The indication of the extended bandwidth and/or the frequency offset may be sent by the second device 220 in SIB and/or RRC signaling.

In some example embodiments, the second device 220 may allocate a frequency resource from the first set of NBs for the communication with the first device 210. Then, the second device 220 may send an indication of the allocated frequency resource to the first device 210. Accordingly, the second device 220 can communicate with the first device 210 in the allocated frequency resource. In some example embodiments, the second device 220 may use the second set of NBs to communicate with other devices such as a legacy device.

In some example embodiments, the second device 220 may receive, from the first device 210, an indication of a capability of using the extended bandwidth. The second device 220 may send an indication of enabling the extended bandwidth to the first device 210.

In some example embodiments, the communication is performed using frequency hopping in at least one of the first set of NBs and the second set of NBs.

All operations and features in the method 400 at the first device 210 as described above with reference to FIGS. 2-6 are likewise applicable to the method 700 at the second device 220 and have similar effects. For the purpose of simplification, the details will be omitted.

Figure 8:
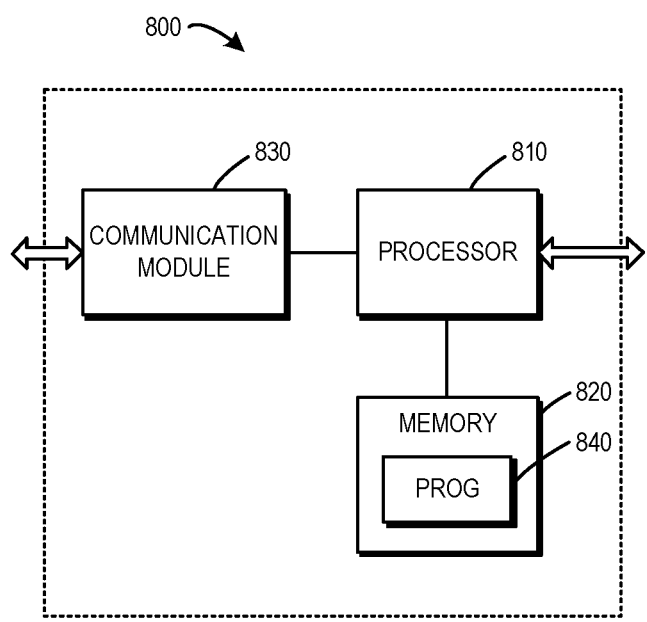
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 can be implemented at or as a part of the first device 210 or the second device 220 as shown in FIG. 2.

As shown, the device 800 includes a processor 810, a memory 820 coupled to the processor 810, a communication module 830 coupled to the processor 810, and a communication interface (not shown) coupled to the communication module 830. The memory 820 stores at least a program 840. The communication module 830 is for bidirectional communications, for example, via multiple antennas. The communication interface may represent any interface that is necessary for communication.

The program 840 is assumed to include program instructions that, when executed by the associated processor 810, enable the device 800 to operate in accordance with the example embodiments of the present disclosure, as discussed herein with reference to FIGS. 2-7. The example embodiments herein may be implemented by computer software executable by the processor 810 of the device 800, or by hardware, or by a combination of software and hardware. The processor 810 may be configured to implement various example embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

When the device 800 acts as the first device 210 or a part of the first device 210, the processor 810 and the communication module 830 may cooperate to implement the method 400 as described above with reference to FIGS. 2-6. When the device 800 acts as the second device 220 or a part of the second device 220, the processor 810 and the communication module 830 may cooperate to implement the method 700 as described above with reference to FIGS. 2 and 7. All operations and features as described above with reference to FIGS. 2-7 are likewise applicable to the device 800 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 700 as described above with reference to FIGS. 2-7. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises: at least one processor; and at least one memory including computer program code; the at least one memory and the computer program code configured to, with the at least one processor, cause the first device to: receive, from a second device, an indication of a reference bandwidth; receive, from the second device, an indication of a bandwidth extended from the reference bandwidth; receive, from the second device, an indication of at least one frequency offset of a first set of narrowbands with respect to a second set of narrowbands associated with the reference bandwidth; and determine, based on the reference bandwidth, the extended bandwidth and the at least one frequency offset, the first set of narrowbands for communication with the second device.

In some example embodiments, the first device is further caused to: receive, from the second device, an indication of a frequency resource allocated from the first set of narrowbands; and perform the communication with the second device in the allocated frequency resource.

In some example embodiments, the first device is further caused to: send, to the second device, an indication of a capability of using the extended bandwidth.

In some example embodiments, the first device is further caused to: receive, from the second device, an indication of enabling the extended bandwidth.

In some example embodiments, the indication of the reference bandwidth is broadcast by the second device.

In some example embodiments, the indication of the extended bandwidth is received from the second device in at least one of a system information block or radio resource control signaling.

In some example embodiments, the indication of the at least one frequency offset is received from the second device in at least one of a system information block or radio resource control signaling.

In some example embodiments, the first set of narrowbands is adjacent to and on one side or both sides of the second set of narrowbands.

In some example embodiments, the at least one frequency offset comprises a frequency offset of a first reference narrowband in the first set of narrowbands with respect to a second reference narrowband in the second set of narrowbands.

In some example embodiments, the indication of the frequency offset of the first reference narrowband with respect to the second reference narrowband comprises the number of physical resource blocks.

In some example embodiments, the extended bandwidth comprises a cell bandwidth.

In some example embodiments, the first device is further caused to: re-index the first set of narrowbands and the second set of narrowbands.

In some example embodiments, the first device is further caused to: perform the communication with the second device using frequency hopping in at least one se to the first set of narrowbands and the second set of narrowbands.

In some example embodiments, the first device comprises a terminal device, and the second device comprises a network device.

In some aspects, a second device comprises: at least one processor; and at least one memory including computer program code; the at least one memory and the computer program code configured to, with the at least one processor, cause the second device to: send, to a first device, an indication of a reference bandwidth; determine a bandwidth extended from the reference bandwidth and at least one frequency offset of a first set of narrowbands with respect to a second set of narrowbands associated with the reference bandwidth; and send, to the first device, an indication of the extended bandwidth and an indication of the at least one frequency offset to allow communication with the first device in the first set of narrowbands.

In some example embodiments, the second device is further caused to: allocate a frequency resource from the first set of narrowbands for the communication; and send, to the first device, an indication of the allocated frequency resource.

In some example embodiments, the second device is further caused to: communicate with a further device in the second set of narrowbands.

In some example embodiments, the second device is further caused to: receive, from the first device, an indication of a capability of using the extended bandwidth.

In some example embodiments, the second device is further caused to: send, to the first device, an indication of enabling the extended bandwidth.

In some example embodiments, the indication of the reference bandwidth is broadcast by the second device.

In some example embodiments, the indication of the extended bandwidth is sent by the second device in at least one of a system information block or radio resource control signaling.

In some example embodiments, the indication of the at least one frequency offset is sent by the second device in at least one of a system information block or radio resource control signaling.

In some example embodiments, the first set of narrowbands is adjacent to and on one side or both sides of the second set of narrowbands.

In some example embodiments, the at least one frequency offset comprises a frequency offset of a first reference narrowband in the first set of narrowbands with respect to a second reference narrowband in the second set of narrowbands.

In some example embodiments, the indication of the frequency offset of the first reference narrowband with respect to the second reference narrowband comprises the number of physical resource blocks.

In some example embodiments, the extended bandwidth comprises a cell bandwidth.

In some example embodiments, the communication is performed using frequency hopping in at least one set of the first set of narrowbands and the second set of narrowbands.

In some example embodiments, the first device comprises a terminal device, and the second device comprises a network device.

In some aspects, a method implemented at a first device comprises: receiving, from a second device, an indication of a reference bandwidth; receiving, from the second device, an indication of a bandwidth extended from the reference bandwidth; receiving, from the second device, an indication of at least one frequency offset of a first set of narrowbands with respect to a second set of narrowbands associated with the reference bandwidth; and determining, based on the reference bandwidth, the extended bandwidth and the at least one frequency offset, the first set of narrowbands for communication with the first device.

In some example embodiments, the method further comprises: receiving an indication of a frequency resource allocated from the first set of narrowbands; and performing the communication with the second device in the allocated frequency resource.

In some example embodiments, the method further comprises: sending, to the second device, an indication of a capability of using the extended bandwidth.

In some example embodiments, the method further comprises: receiving, from the second device, an indication of enabling the extended bandwidth.

In some example embodiments, the indication of the reference bandwidth is broadcast by the second device.

In some example embodiments, the indication of the extended bandwidth is received from the second device in at least one of a system information block or radio resource control signaling.

In some example embodiments, the indication of the at least one frequency offset is received from the second device in at least one of a system information block or radio resource control signaling.

In some example embodiments, the first set of narrowbands is adjacent to and on one side or both sides of the second set of narrowbands.

In some example embodiments, the at least one frequency offset comprises a frequency offset of a first reference narrowband in the first set of narrowbands with respect to a second reference narrowband in the second set of narrowbands.

In some example embodiments, the indication of the frequency offset of the first reference narrowband with respect to the second reference narrowband comprises the number of physical resource blocks.

In some example embodiments, the extended bandwidth comprises a cell bandwidth.

In some example embodiments, the method further comprises: re-indexing the first set of narrowbands and the second set of narrowbands.

In some example embodiments, the method further comprises: performing the communication with the second device using frequency hopping in at least one set of the first set of narrowbands and the second set of narrowbands.

In some example embodiments, the first device comprises a terminal device, and the second device comprises a network device.

In some aspects, a method implemented at a second device, comprises: sending, to a first device, an indication of a reference bandwidth; determining a bandwidth extended from the reference bandwidth and at least one frequency offset of a first set of narrowbands with respect to a second set of narrowbands associated with the reference bandwidth; and sending, to the first device, an indication of the extended bandwidth and an indication of the at least one frequency offset to allow communication with the first device in the first set of narrowbands.

In some example embodiments, the method further comprises: allocating a frequency resource from the first set of narrowbands for the communication; and sending, to the first device, an indication of the allocated frequency resource.

In some example embodiments, the method further comprises: communicating with a further device in the second set of narrowbands.

In some example embodiments, the method further comprises: receiving, from the first device, an indication of a capability of using the extended bandwidth.

In some example embodiments, the method further comprises: sending, to the first device, an indication of enabling the extended bandwidth.

In some example embodiments, the indication of the reference bandwidth is broadcast by the second device.

In some example embodiments, the indication of the extended bandwidth is sent by the second device in at least one of a system information block or radio resource control signaling.

In some example embodiments, the indication of the frequency offset is sent by the second device in at least one of a system information block or radio resource control signaling.

In some example embodiments, the first set of narrowbands is adjacent to and on one side or both sides of the second set of narrowbands.

In some example embodiments, the at least one frequency offset comprises a frequency offset of a first reference narrowband in the first set of narrowbands with respect to a second reference narrowband in the second set of narrowbands.

In some example embodiments, the indication of the frequency offset of the first reference narrowband with respect to the second reference narrowband comprises the number of physical resource blocks.

In some example embodiments, the extended bandwidth comprises a cell bandwidth.

In some example embodiments, the communication is performed using frequency hopping in at least one set of the first set of narrowbands and the second set of narrowbands.

In some example embodiments, the first device comprises a terminal device, and the second device comprises a network device.

In some aspects, an apparatus comprises: means for receiving, from a second device, an indication of a reference bandwidth; means for receiving, from the second device, an indication of a bandwidth extended from the reference bandwidth; means for receiving, from the second device, an indication of at least one frequency offset of a first set of narrowbands with respect to a second set of narrowbands associated with the reference bandwidth; and means for determining, based on the reference bandwidth, the extended bandwidth and the at least one frequency offset, the first set of narrowbands for communication between the second device.

In some example embodiments, the apparatus further comprises: means for receiving, from the second device, an indication of a frequency resource allocated from the first set of narrowbands; and performing the communication with the second device in the allocated frequency resource.

In some example embodiments, the apparatus further comprises: means for sending, to the second device, an indication of a capability of using the extended bandwidth.

In some example embodiments, the apparatus further comprises: means for receiving, from the second device, an indication of enabling the extended bandwidth.

In some example embodiments, the indication of the reference bandwidth is broadcast by the second device.

In some example embodiments, the indication of the extended bandwidth is received from the second device in at least one of a system information block or radio resource control signaling.

In some example embodiments, the indication of the at least one frequency offset is received from the second device in at least one of a system information block or radio resource control signaling.

In some example embodiments, the first set of narrowbands is adjacent to and on one side or both sides of the second set of narrowbands.

In some example embodiments, the at least one frequency offset comprises a frequency offset of a first reference narrowband in the first set of narrowbands with respect to a second reference narrowband in the second set of narrowbands.

In some example embodiments, the indication of the frequency offset of the first reference narrowband with respect to the second reference narrowband comprises the number of physical resource blocks.

In some example embodiments, the extended bandwidth comprises a cell bandwidth.

In some example embodiments, the apparatus further comprises: means for re-indexing the first set of narrowbands and the second set of narrowbands.

In some example embodiments, the apparatus further comprises: means for performing the communication with the second device using frequency hopping in at least one set of the first set of narrowbands and the second set of narrowbands.

In some example embodiments, the first device comprises a terminal device, and the second device comprises a network device.

In some aspects, an apparatus comprises: means for sending, to a first device, an indication of a reference bandwidth; means for determining a bandwidth extended from the reference bandwidth and at least one frequency offset of a first set of narrowbands with respect to a second set of narrowbands associated with the reference bandwidth; and means for sending, to the first device, an indication of the extended bandwidth and an indication of the at least one frequency offset to allow communication with the first device in the first set of narrowbands.

In some example embodiments, the apparatus further comprises: means for receiving, from the first device, an indication of a capability of using the extended bandwidth.

In some example embodiments, the apparatus further comprises: means for sending, to the first device, an indication of enabling the extended bandwidth.

In some example embodiments, the indication of the reference bandwidth is broadcast by the second device.

In some example embodiments, the indication of the extended bandwidth is sent by the second device in at least one of a system information block or radio resource control signaling.

In some example embodiments, the indication of the at least one frequency offset is sent by the second device in at least one of a system information block or radio resource control signaling.

In some example embodiments, the first set of narrowbands is adjacent to and on one side or both sides of the second set of narrowbands.

In some example embodiments, the at least one frequency offset comprises a frequency offset of a first reference narrowband in the first set of narrowbands with respect to a second reference narrowband in the second set of basic narrowbands.

In some example embodiments, the indication of the frequency offset of the first reference narrowband with respect to the second reference narrowband comprises the number of physical resource blocks.

In some example embodiments, the extended bandwidth comprises a cell bandwidth.

In some example embodiments, the communication is performed using frequency hopping in at least one set of the first set of narrowbands and the second set of narrowbands.

In some example embodiments, the first device comprises a terminal device, and the second device comprises a network device.

In some aspects, a computer readable storage medium comprises program instructions stored thereon, the instructions, when executed by a processor of a device, causing the device to perform the method according to some example embodiments of the present disclosure.

What is claimed is:

1. A first device, comprising:
at least one processor; and
at least one non-transitory memory including computer program code;
the at least one memory and the computer program code configured to, with the at least one processor, cause the first device to:
receive, from a second device, an indication of a reference bandwidth;
receive, from the second device, an indication of a bandwidth extended from the reference bandwidth;
receive, from the second device, an indication of at least one frequency offset of a first set of narrowbands with respect to a second set of narrowbands associated with the reference bandwidth; and
determine, based on the reference bandwidth, the extended bandwidth and the frequency offset, the first set of narrowbands for communication with the second device.

2. The first device of claim 1, wherein the at least one memory and the computer program code are configured to, with the at least one processor, cause the first device to:
receive, from the second device, an indication of a frequency resource allocated from the first set of narrowbands; and
perform the communication with the second device in the allocated frequency resource.

3. The first device of claim 1, wherein the at least one memory and the computer program code are configured to, with the at least one processor, cause the first device to: send, to the second device, an indication of a capability of using the extended bandwidth.

4. The first device of claim 1, wherein the at least one memory and the computer program code are configured to, with the at least one processor, cause the first device to: receive, from the second device, an indication of enabling the extended bandwidth.

5. The first device of claim 1, wherein the indication of the reference bandwidth is broadcast by the second device.

6. The first device of claim 1, wherein the indication of the extended bandwidth is received from the second device in at least one of a system information block or radio resource control signaling.

7. The first device of claim 1, wherein the indication of the at least one frequency offset is received from the second device in at least one of a system information block or radio resource control signaling.

8. The first device of claim 1, wherein the first set of narrowbands is adjacent to and on one side or both sides of the second set of narrowbands.

9. The first device of claim 1, wherein the at least one frequency offset comprises a frequency offset of a first reference narrowband in the first set of narrowbands with respect to a second reference narrowband in the second set of narrowbands; and wherein the indication of the frequency offset of the first reference narrowband with respect to the second reference narrowband comprises the number of physical resource blocks.

10. The first device of claim 1, wherein the extended bandwidth comprises a cell bandwidth.

11. The first device of claim 1, wherein the at least one memory and the computer program code are configured to, with the at least one processor, cause the first device to: re-index the first set of narrowbands and the second set of narrowbands.

12. The first device of claim 1, wherein the at least one memory and the computer program code are configured to, with the at least one processor, cause the first device to: perform the communication with the second device using frequency hopping in at least one set of the first set of narrowbands and the second set of narrowbands.

13. The first device of claim 1, wherein the first device comprises a terminal device, and the second device comprises a network device.

14. A second device, comprising:
at least one processor; and
at least one non-transitory memory including computer program code;
the at least one memory and the computer program code configured to, with the at least one processor, cause the second device to:
send, to a first device, an indication of a reference bandwidth;
determine a bandwidth extended from the reference bandwidth and at least one frequency offset of a first set of narrowbands with respect to a second set of narrowbands associated with the reference bandwidth; and
send, to the first device, an indication of the extended bandwidth and an indication of the at least one frequency offset to allow communication with the first device in the first set of narrowbands.

15. The second device of claim 14, wherein the at least one memory and the computer program code are configured to, with the at least one processor, cause the second device to:
allocate a frequency resource from the first set of narrowbands for the communication; and
send, to the first device, an indication of the allocated frequency resource.

16. The second device of claim 14, wherein the at least one memory and the computer program code are configured to, with the at least one processor, cause the second device to: communicate with a further device in the second set of narrowbands.

17. The second device of claim 14, wherein the at least one memory and the computer program code are configured to, with the at least one processor, cause the second device to: receive, from the first device, an indication of a capability of using the extended bandwidth.

18. The second device of claim 14, wherein the at least one memory and the computer program code are configured to, with the at least one processor, cause the second device to: send, to the first device, an indication of enabling the extended bandwidth.

19. The second device of claim 14, wherein the indication of the reference bandwidth is broadcast by the second device.

20. The second device of claim 14, wherein the indication of the extended bandwidth is sent by the second device in at least one of a system information block or radio resource control signaling.

21. The second device of claim 14, wherein the indication of the at least one frequency offset is sent by the second device in at least one of a system information block or radio resource control signaling.

22. The second device of claim 14, wherein the first set of narrowbands is adjacent to and on one side or both sides of the second set of narrowbands.

23. The second device of claim 14, wherein the at least one frequency offset comprises a frequency offset of a first reference narrowband in the first set of narrowbands with respect to a second reference narrowband in the second set of narrowbands; and wherein the indication of the frequency offset of the first reference narrowband with respect to the second reference narrowband comprises the number of physical resource blocks.

24. The second device of claim 14, wherein the extended bandwidth comprises a cell bandwidth.

25. The second device of claim 14, wherein the communication is performed using frequency hopping in at least one set of the first set of narrowbands and the second set of narrowbands.

26. The second device of claim 14, wherein the first device comprises a terminal device, and the second device comprises a network device.

27. A method implemented at a first device, comprising:
receiving, from a second device, an indication of a reference bandwidth;
receiving, from the second device, an indication of a bandwidth extended from the reference bandwidth;
receiving, from the second device, an indication of at least one frequency offset of a first set of narrowbands with respect to a second set of narrowbands associated with the reference bandwidth; and
determining, based on the reference bandwidth, the extended bandwidth and the at least one frequency offset, the first set of narrowbands for communication with the second device.

28. The method of claim 27, further comprising:
receiving, from the second device, an indication of a frequency resource allocated from the first set of narrowbands; and
performing the communication with the second device in the allocated frequency resource.

29. The method of claim 27, further comprising: sending, to the second device, an indication of a capability of using the extended bandwidth.

30. The method of claim 27, further comprising: receiving, from the second device, an indication of enabling the extended bandwidth.

31. The method of claim 27, wherein the indication of the reference bandwidth is broadcast by the second device.

32. The method of claim 27, wherein the indication of the extended bandwidth is received from the second device in at least one of a system information block or radio resource control signaling.

33. The method of claim 27, wherein the indication of the at least one frequency offset is received from the second device in at least one of a system information block or radio resource control signaling.

34. The method of claim 27, wherein the first set of narrowbands is adjacent to and on one side or both sides of the second set of narrowbands.

35. The method of claim 27, wherein the at least one frequency offset comprises a frequency offset of a first reference narrowband in the first set of narrowbands with respect to a second reference narrowband in the second set of narrowbands; and wherein the indication of the frequency offset of the first reference narrowband with respect to the second reference narrowband comprises the number of physical resource blocks.

36. The method of claim 27, wherein the extended bandwidth comprises a cell bandwidth.

37. The method of claim 27, further comprising: re-indexing the first set of narrowbands and the second set of narrowbands.

38. The method of claim 27, further comprising: performing the communication with the second device using frequency hopping in at least one set of the first set of narrowbands and the second set of narrowbands.

39. The method of claim 27, wherein the first device comprises a terminal device, and the second device comprises a network device.

40. A method implemented at a second device, comprising:
sending, to a first device, an indication of a reference bandwidth;
determining a bandwidth extended from the reference bandwidth and at least one frequency offset of a first set of narrowbands with respect to a second set of narrowbands associated with the reference bandwidth; and
sending, to the first device, an indication of the extended bandwidth and an indication of the at least one frequency offset to allow communication with the first device in the first set of narrowbands.

41. The method of claim 40, further comprising:
allocating a frequency resource from the first set of narrowbands for the communication; and
sending, to the first device, an indication of the allocated frequency resource.

42. The method of claim 40, further comprising: communicating with a further device in the second set of narrowbands.

43. The method of claim 40, further comprising: receiving, from the first device, an indication of a capability of using the extended bandwidth.

44. The method of claim 40, further comprising: sending, to the first device, an indication of enabling the extended bandwidth.

45. The method of claim 40, wherein the indication of the reference bandwidth is broadcast by the second device.

46. The method of claim 40, wherein the indication of the extended bandwidth is sent by the second device in at least one of a system information block or radio resource control signaling.

47. The method of claim 40, wherein the indication of the at least one frequency offset is sent by the second device in at least one of a system information block or radio resource control signaling.

48. The method of claim 40, wherein the first set of narrowbands is adjacent to and on one side or both sides of the second set of narrowbands.

49. The method of claim 40, wherein the at least one frequency offset comprises a frequency offset of a first reference narrowband in the first set of narrowbands with respect to a second reference narrowband in the second set of narrowbands; and wherein the indication of the frequency offset of the first reference narrowband with respect to the second reference narrowband comprises the number of physical resource blocks.

50. The method of claim 40, wherein the extended bandwidth comprises a cell bandwidth.

51. The method of claim 40, wherein the communication is performed using frequency hopping in at least one set of the first set of narrowbands and the second set of narrowbands.

52. The method of claim 40, wherein the first device comprises a terminal device, and the second device comprises a network device.

53. A non-transitory computer readable storage medium comprising program instructions stored thereon, the instructions, when executed by a processor of a device, causing the device to perform the method of claim 27.

54. A non-transitory computer readable storage medium comprising program instructions stored thereon, the instructions, when executed by a processor of a device, causing the device to perform the method of claim 40.

* * * * *